United States Patent
Kautzky et al.

(10) Patent No.: US 9,142,229 B2
(45) Date of Patent: Sep. 22, 2015

(54) HEAT ASSISTED MAGNETIC RECORDING HEAD HAVING THERMAL SENSOR WITH HIGH-TCR TRANSPARENT CONDUCTING OXIDE

(71) Applicant: Seagate Technology LLC, Cupertino, CA (US)

(72) Inventors: Michael Christopher Kautzky, Eagan, MN (US); Sarbeswar Sahoo, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 13 days.

(21) Appl. No.: 13/836,331

(22) Filed: Mar. 15, 2013

(65) Prior Publication Data

US 2014/0269238 A1    Sep. 18, 2014

(51) Int. Cl.
| | |
|---|---|
| *G11B 11/00* | (2006.01) |
| *G11B 5/31* | (2006.01) |
| *G11B 5/40* | (2006.01) |
| *G11B 5/60* | (2006.01) |
| G11B 5/00 | (2006.01) |

(52) U.S. Cl.
CPC .............. *G11B 5/3133* (2013.01); *G11B 5/314* (2013.01); *G11B 5/40* (2013.01); *G11B 5/607* (2013.01); *G11B 5/6076* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 3,232,886 A | 2/1966 | Hoffman | |
| 5,610,572 A | 3/1997 | Yajima | |
| 6,433,310 B1* | 8/2002 | Wickramasinghe et al. | . 219/216 |
| 6,433,957 B1 | 8/2002 | Rudd et al. | |
| 7,731,337 B2 | 6/2010 | Kang et al. | |
| 8,085,513 B2 | 12/2011 | Sasaki | |
| 8,098,464 B2 | 1/2012 | Shimazawa | |
| 8,339,740 B2 | 12/2012 | Zou et al. | |
| 2002/0101812 A1* | 8/2002 | Wickramasinghe et al. | ... 369/99 |
| 2009/0128965 A1 | 5/2009 | Mizuno et al. | |
| 2009/0251139 A1 | 10/2009 | Warin et al. | |
| 2010/0074616 A1* | 3/2010 | Kewitsch | ......................... 398/38 |
| 2011/0205863 A1 | 8/2011 | Zhao et al. | |
| 2011/0272575 A1* | 11/2011 | Kim et al. | ...................... 250/288 |
| 2011/0299367 A1* | 12/2011 | Naniwa et al. | ............. 369/13.33 |
| 2012/0051196 A1* | 3/2012 | Grobis et al. | .............. 369/13.33 |
| 2012/0314549 A1 | 12/2012 | Lee et al. | |
| 2013/0286802 A1* | 10/2013 | Kiely | ......................... 369/13.31 |
| 2013/0286805 A1* | 10/2013 | Macken et al. | ............ 369/13.33 |
| 2013/0286807 A1* | 10/2013 | Gao et al. | ................... 369/13.33 |

OTHER PUBLICATIONS

Gupta et al., "Optoelectrical properties ZnO and W-doped $In_2O_3$ multilayer films grown by pulsed laser deposition", Journal of Optoelectronics and Biomedical Materials, vol. 1, Issue 2, Jun. 2009, p. 209-214.

(Continued)

*Primary Examiner* — Tan X Dinh
(74) *Attorney, Agent, or Firm* — Hollingsworth Davis, LLC

(57) ABSTRACT

A head transducer includes a thermal sensor comprising a conducting ceramic material having a temperature coefficient of resistance. The thermal sensor can comprise a transparent conducting oxide having a temperature coefficient of resistance. The thermal sensor can be situated proximate a near-field transducer of the heat-assisted magnetic recording head transducer.

22 Claims, 8 Drawing Sheets

(56) References Cited

OTHER PUBLICATIONS

Minami, "Transparent conducting oxide semiconductors for transparent electrodes", Semicond. Sci. Technol., vol. 20, 2005, p. 35-44.

Wu et al., "Characterization of aluminum-doped zinc oxide thin films by RF magnetron sputtering at different substrate temperature and sputtering power", Journal of Materials Science: Materials in Electronics, vol. 24, Issue 1, Jan. 2013, pp. 166-171.

* cited by examiner

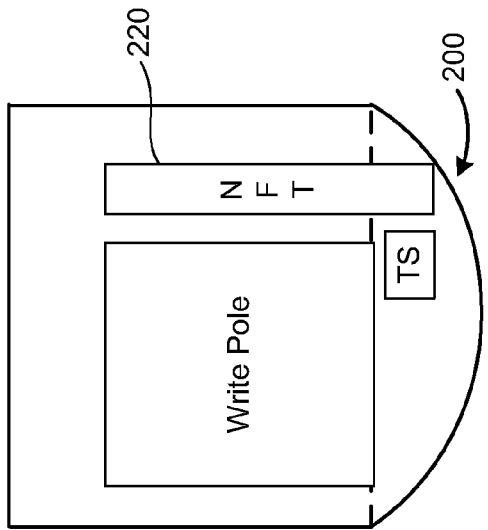
Figure 2A
Laser Off
Writer Heater Off
Write Coil Off
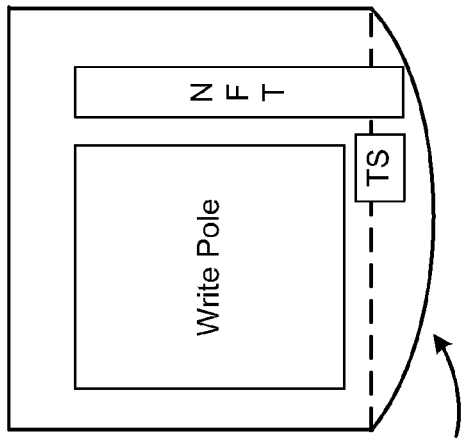
Figure 2B
Laser Off
Writer Heater On
Write Coil On
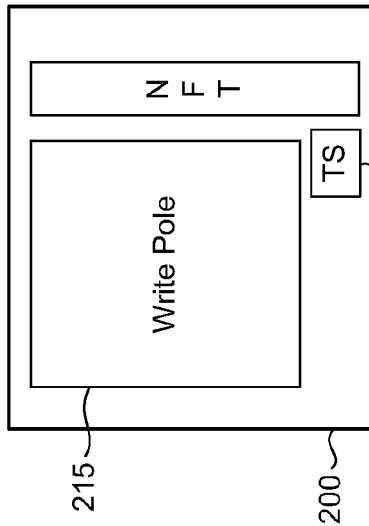
Figure 2C
Laser On
Writer Heater On
Write Coil On

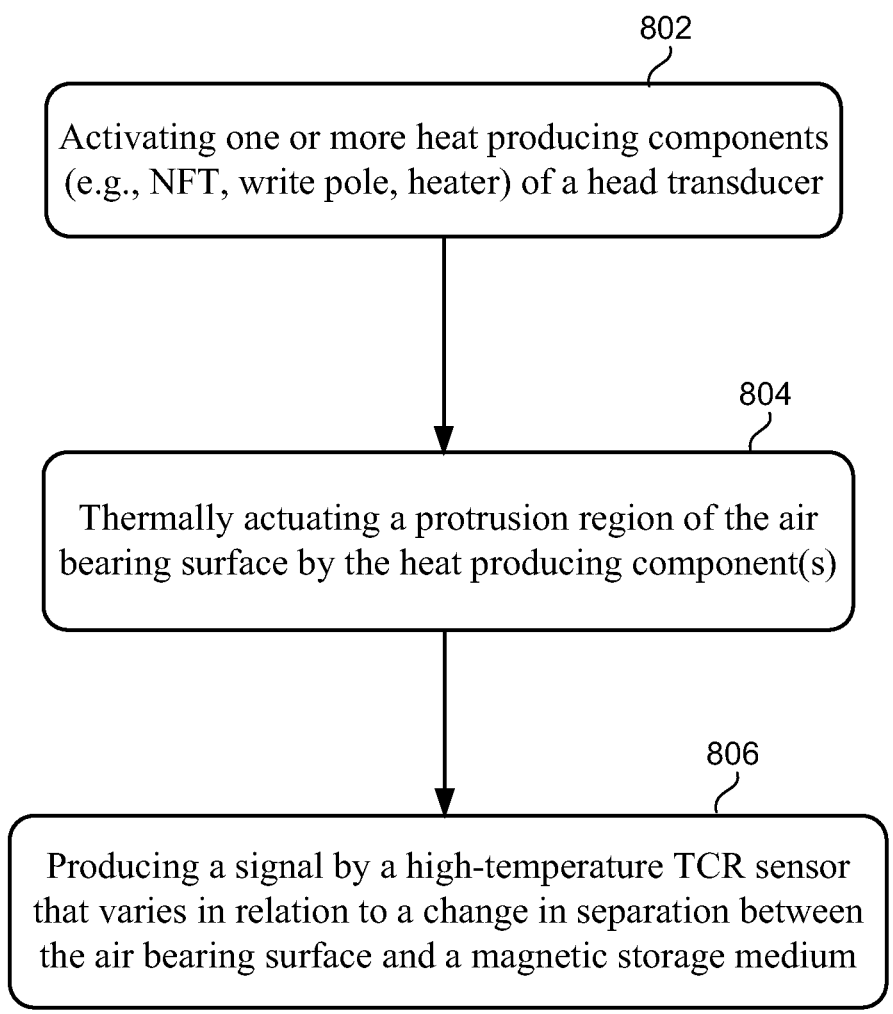

HEAT ASSISTED MAGNETIC RECORDING HEAD HAVING THERMAL SENSOR WITH HIGH-TCR TRANSPARENT CONDUCTING OXIDE

SUMMARY

Embodiments of the disclosure are directed to an apparatus which includes a head transducer and a thermal sensor at the head transducer. The thermal sensor comprises a conducting ceramic material having a temperature coefficient of resistance. In some embodiments, the thermal sensor comprises a transparent conducting oxide having a temperature coefficient of resistance.

According to some embodiments, an apparatus includes a head transducer, a near-field transducer at the head transducer, and a thermal sensor proximate the near-field transducer and configured to produce a sensor signal indicative of temperature. The thermal sensor comprises a transparent conducting oxide having a temperature coefficient of resistance.

In accordance with other embodiments, a method involves sensing a temperature proximate a near-field transducer of a head transducer using a thermal sensor comprising a conducting ceramic material having a temperature coefficient of resistance. Some embodiments are directed to a method involving sensing a temperature proximate a near-field transducer of a head transducer using a thermal sensor comprising a transparent conducting oxide having a temperature coefficient of resistance.

These and other features and aspects of various embodiments may be understood in view of the following detailed discussion and accompanying drawings.

BRIEF DESCRIPTION OF THE DRAWINGS

FIGS. 2A-C are simplified views of head transducer protrusion resulting from actuation of one or more heat-producing transducer components in accordance with various embodiments;

FIGS. 7 and 8 are flow charts showing various processes of methods employing a high-TCR sensor for detecting head-media contact and/or head-media separation changes in accordance with various embodiments.

DETAILED DESCRIPTION

The present disclosure generally relates to magnetic recording devices used for data storage. Data storage systems may include one or more transducers that respectively write (e.g., a writer) and read (e.g., a reader) information to and from a magnetic storage medium. It is typically desirable to have a relatively small distance or separation between a transducer and its associated media. This distance or spacing is referred to herein as "head-media separation" (HMS). By reducing the head-media separation, a reader and a writer is generally better able to both write and read data to and from a medium. Reducing the head-media separation also allows for surveying of magnetic storage medium topography, such as for detecting asperities and other features of the recording medium surface.

To establish head-media separation in a storage system, head-media contact is detected. Head-media contact detection and/or head-media separation sensing technologies are important for the performance and reliability of hard disk drives. Higher contact detection repeatability enables lower active clearance, and thus higher recording density. Higher contact detection sensitivity reduces wear and improves reliability.

One approach for detecting contact involves evaluating a temperature profile for a recording head transducer before, during, and after contact between the head transducer and a surface of a magnetic recording medium. When the head transducer is actuated by a thermal actuator, the head transducer surface temperature increases with the actuation due to the heat generated by the thermal actuator. The head transducer temperature will then be higher than the temperature of the medium. As such, the medium acts as a heat sink. When the head transducer contacts the medium, the head transducer surface temperature drops due to a change in heat transfer rate resulting from the contact. The head transducer surface temperature then continues to increase due to the continued thermal actuator heating as well as the added frictional heating. The change in temperature or excursion in temperature trajectory can be used to declare head-media contact. Details concerning head-media separation and contact determinations which can be implemented in apparatuses and methods in accordance with various embodiments of the disclosure are provided in commonly owned U.S. Patent Application Publication Nos. 2012/0120519, 2012/0120522, 2012/0120527, 2012/0120982, and 2012/0113207, each of which is incorporated herein by reference.

Figure 1:
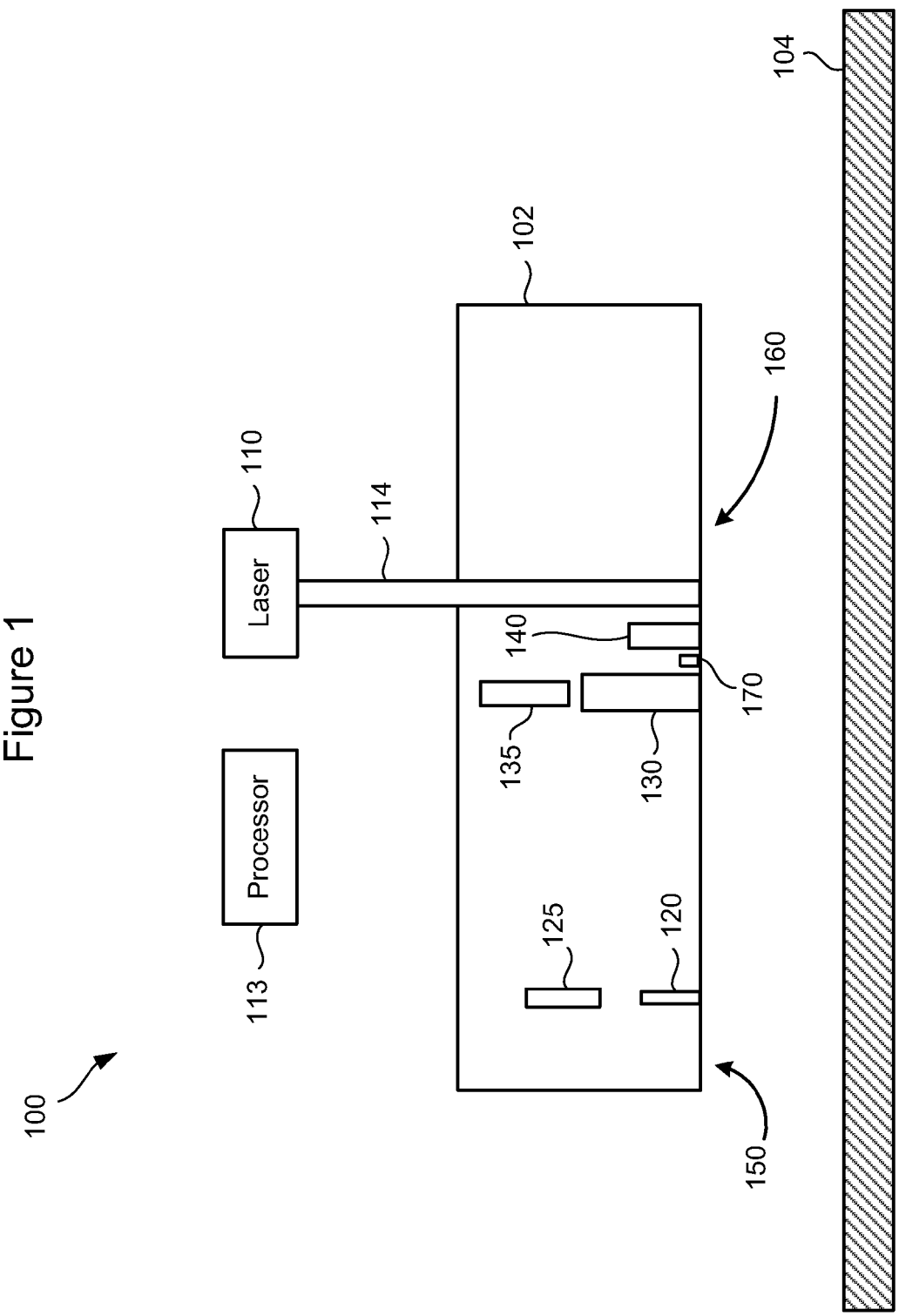
FIG. 1 is a block diagram of a head transducer arrangement in accordance with various embodiments.

A head transducer arrangement 100 for detecting sensing temperature and head-media contact in accordance with various embodiments is illustrated in FIG. 1. The head transducer arrangement 100 includes a recording head transducer 102 comprising a slider 150 positioned proximate a rotating magnetic medium 104. The magnetic medium 104 is configurable for reading and/or writing data with head transducer 102. The surface of head transducer 102 facing magnetic medium 104 includes an air bearing surface (ABS) 160.

The head transducer 102 includes a reader 120 and a writer 130 proximate the ABS 160 for respectively reading and writing data from/to the magnetic medium 104. The writer 130 is configured for heat assisted magnetic recording (HAMR) and is located proximate a laser arrangement including light source 110 (e.g., laser diode). Light source 110 can be mounted external, or integral, to the head transducer 102. Light source 110 energizes a near-field transducer (NFT) 140 via a waveguide 114 proximate the ABS 160 and writer 130 respectively.

The writer 130 includes a corresponding heater 135, and reader 120 also includes a corresponding heater 125 according to various embodiments. Each of the heaters 125, 135 is thermally coupled to head transducer 102 and may be a resistive heater that generates heat as electrical current is passed through the heaters 125, 135. The heaters 125, 135 are not limited to resistive heaters, and may include any type of heating source. A processor can be configured to adjust the power supplied to one or both of heaters 125, 135. For example, power supplied to heater 135 can be adjusted when NFT 140 and/or writer 130 is activated to adjust the spacing between ABS 160 and magnetic medium 140.

At the air bearing surface 160 and proximate the NFT 140 and writer 130 is a thermal sensor 170. Thermal sensor 170 is described herein as a resistance temperature sensor composed of materials having a temperature coefficient of resistance (TCR). One example of a TCR sensor is a dual-ended temperature coefficient of resistance sensor (DETCR). A TCR sensor measures temperature change by measuring the change in resistance, or rate of change in resistance, across the sensor. The thermal sensor 170 measures the temperature change at ABS 160 induced by all thermal condition changes from air pressure, clearance, head operation, and contact, among other changes.

The apparatus shown in FIG. 1 also includes a processor or controller 113 according to various embodiments. Processor 113 can be configured to perform a variety of functions, including controlling power delivery to laser 110 and to heaters 125 and 135. In some embodiments, processor 113 is configured to adjust power supplied to one or both of the laser 110 and writer heater 135 for purposes of adjusting fly height of transducer 102 relative to magnetic storage medium 104. The processor 113 can be coupled to thermal sensor 170 and configured to measure head transducer temperature, from which head-media separation and head-media contact can be measured/detected in accordance with various embodiments.

Head-media contact detection typically involves intentional protruding of the air bearing surface of the head transducer into an air gap between the head transducer and an adjacent magnetic storage medium in response to thermal actuation by one or a combination of different heat sources at the head transducer. In heat assisted magnetic recording (HAMR), for example, the head transducer can be subjected to at least three sources of heat. One heat source is the write coil of the writer when actuated. A second source involves heating components included in the head transducer and associated with the reader and writer circuitry, which can be selectively activated to intentionally expand the air bearing surface. The heating components are controllable/programmable to vary the total amount of heat actuating the head transducer and, therefore, the magnitude of reader and/or writer protrusion. A third source is the NFT corresponding to the HAMR heat source, e.g., a laser. The NFT transforms laser energy to thermal energy in order to heat a spot on the magnetic medium during write operations.

Each of these heat sources alone, or in combination, cause the head transducer materials at the air bearing surface to expand. When the materials expand, they cause the air bearing surface to protrude into the air gap between the head transducer and the magnetic storage medium. For the highest likelihood of detecting contact, the TCR sensor is preferably located as close as possible to a maximum area of protrusion. For example, the TCR sensor may be located at or as close as possible to the close point of the transducer. Since protrusion is caused by heat generated in the head transducer, it is beneficial to locate a TCR sensor at or near the heat generation source or sources, e.g., the writer, NFT, and heater(s). A TCR sensor (e.g., a reference temperature sensor) may also be located away from these heat sources and the ABS, allowing for differential temperature measurements to be made.

In the embodiment illustrated in FIG. 1, thermal sensor 170 is situated near the NFT 140, which is typically the component that produces the greatest amount of heat at the head transducer 102. The thermal sensor 170 is configured to produce a signal indicative of a temperature near the NFT 140. The sensed temperature at the thermal sensor location can be influenced by heat produced by writer 130, heaters 125 and 135, and other sources of heat within the magnetic recording device (e.g., hard disk drive). In some embodiments, the thermal sensor 170 is configured to operate in thermal environments exceeding 200° C. In other embodiments, the thermal sensor 170 is configured to operate in thermal environments exceeding 220° C. In further embodiments, the thermal sensor 170 is configured to operate in thermal environments exceeding 250° C. (e.g., up to about 400° C.).

FIGS. 2A-C show general protrusion progression using a simplified cross-sectional view of a writer portion of a head transducer 200. In FIG. 2A head transducer 200 is in a non-thermally actuated state. In this state, the laser, writer heater, and writer coil are all off. Thus, head transducer 200 attains a default, non-actuated shape/state establishing a default separation between medium 280 and air bearing surface 250 of the head transducer 200. This default separation is illustrated by air gap 270.

FIG. 2B illustrates the transducer 200 with the writer coil and heater activated, but the laser inactive. Here, the writer-related components (write pole 215, NFT 220 and thermal sensor (TS) 225) expand. The write pole 215; the NFT 220; and the thermal sensor 225 expand causing the air bearing surface 250 to protrude into the air gap 270. Thus, the air gap 270 and the distance between air bearing surface 250 and the medium 280 decreases. The dashed line indicates the default state/shape of air bearing surface 250. As can be seen, the actuation of the two heat sources expands the writer components, and adjoining head transducer materials, to protrude beyond the default shape of the head transducer 200 shown in FIG. 2A.

The protrusion is further expanded by the additional actuation of the laser, as shown in FIG. 2C. The additional heat produced by the NFT 220 in response to the incident laser light further expands the air bearing surface 250 into air gap 270. The stroke, or magnitude of the protrusion along the cross track direction (z-axis) of the head transducer 200, changes with introduction of additional heat. It is noted that the thermal sensor 225 of FIGS. 2A-2C is shown located on the pole side of the transducer 200, such that it resides between the write pole 215 and the NFT 220. In some embodiments, the thermal sensor 225 is located on the non-pole side of the transducer 200, such that it resides on the other side of the NFT 220 (right of NFT 220 in the illustration of FIGS. 2A-2C) as in the configuration depicted in FIG. 4.

Referring once again to FIG. 1, the thermal sensor 170 is preferably implemented as a TCR sensor capable of sensing temperatures of intense heat due to being situated at or near the NFT 140. In addition to being capable of sensing intense heat, thermal sensor 170 preferably has a high temperature coefficient of resistance which provides for high sensitivity and a high signal-to-noise (SNR) ratio when operating in thermal environments exceeding 200° C. or 250° C., for example. In some embodiments, thermal sensor 170 preferably has a high temperature coefficient of resistance which provides for high sensitivity and a high signal-to-noise (SNR) ratio when operating in thermal environments exceeding 300° C., 350° C., or as high as 400° C., for example.

Conventional TCR sensors used for head-media contact detection rely on common metals such as Cr or NiFe for the thermal sensing elements. Temperature coefficients of resistance (TCR) values for these materials are low, typically in the 0.1-0.3%/° C. range, which limits the sensitivity and SNR when being used in high temperature sensing applications. Moreover, many of these conventional materials are prone to high-temperature oxidation. The materials of conventional TCR sensors are unsuitable for use in thermal environments dominated by heat produced by an NFT. 220. Materials having larger TCR values are desirable, including those with high TCR values in the >1%/° C. range, which are typically observed either in semiconductors, complex oxide-based systems like defected vanadium oxides or perovskite oxides with very high resistivity, or in metal systems near the percolation limit which introduces unusual, but hard-to-control electron transport effects.

According to various embodiments, a thermal sensor well suited for incorporation in a head transducer that includes an NFT and configured to operate in thermal environments exceeding 200° C., 300° C., or even 400° C., for example, comprises a conducting ceramic material having a temperature coefficient of resistance. In various embodiments, a thermal sensor well suited for incorporation in a head transducer that includes an NFT comprises a transparent conducting oxide (TCO) having a temperature coefficient of resistance. A TCR sensor comprising a transparent conducting ceramic material, such as a TCO, has substantially lower heat absorption than a metal TCR sensor, for example, resulting from light-induced heating at or near the NFT and/or waveguide. Because a TCR sensor comprising a transparent conducting ceramic material has lower heat absorption from light-induced heating at or near the NFT and/or waveguide than a metal TCR sensor, TCR sensors according to embodiments of the disclosure sink far less heat away from the thermal environment surrounding the transparent TCR sensor than do metal TCR sensors, thereby increasing temperature sensing accuracy.

As previously discussed, a TCR sensor is biased to operate at a temperature higher than the magnetic storage medium temperature. Due to various forms of heating within a magnetic storage device, the average operating temperature of a magnetic storage medium is generally well above an ambient temperature external of the magnetic storage device. For HAMR devices, for example, a TCR sensor is biased at a relatively high temperature due to the heat effects of the NFT, in particular. In order to situate a TCR sensor at or near the NFT, it can be appreciated that such a TCR sensor will be subjected to heating due to sensor biasing and the thermal condition at the NFT. Modeling data shows that a TCR sensor positioned adjacent an NFT can experience a temperature change of about 100° C. during operation. According to some embodiments, when coupled with bias current-induced heating at 100 mV of ~60° C. and another 55° C. from top-end ambient temperature in a modeled hard disk drive, a TCR sensor can easily be exposed to temperature well in excess of 220° C., which is substantially higher than that of non-HAMR devices.

Modeling data for various HAMR heat transducers show that the temperature rise within the NFT can go up as high as 1000° C. by absorbing only 1 mW optical power (see, e.g., commonly owned US Patent Application Publication 2012/0314549, which is incorporated herein by reference). Although this temperature increase within the NFT is very large, the temperature at the head transducer external of the NFT is significantly lower due to conductive, convective, and radiation cooling effects. Notwithstanding these cooling effects, it can be appreciated that a TCR sensor situated adjacent an NFT will be exposed to temperatures appreciably higher than those associated with head transducers of non-HAMR devices. It is noted that certain transparent conducting oxides well suited for use in various TCR sensor embodiments have good inherent oxidation resistance, melting temperature above 1800° C., and reasonably good wear properties, making them well suited for high-temperature applications.

Thermal sensors in accordance with embodiments of the disclosure are preferably implemented to have (a) adequate TCR to overcome any potential loss of output due to bias current margin compression (i.e., lower bias current may be required to compensate for the increased ambient temperature and insure that overall TCR temperature stays below failure threshold), and (b) high-temperature durability to resist accelerated thermally-induced microstructural instability, interface reaction, or ABS oxidation effects from the HAMR device environment. Various embodiments are directed to thermal sensors comprising a simple, ceramic-based high-TCR material possessing good chemical stability and acceptable resistance for temperature sensing at a HAMR transducer head.

Various embodiments are directed to thermal sensors for use in high temperature head transducer environments exceeding 200° C., 250° C., 300° C., 350° C. or 400° C. for example. Embodiments are directed to thermal sensors for use in high temperature head transducer environments that have TCR values exceeding those of conventional CR and NiFe thermal sensors. In various embodiments, thermal sensors for use in high temperature head transducer environments have TCR values exceeding about 0.5%/° C. In some embodiments, thermal sensors for use in high temperature head transducer environments have TCR values exceeding about 1%/° C. In other embodiments, thermal sensors for use in high temperature head transducer environments have TCR values exceeding about 1.5%/° C. In further embodiments, thermal sensors for use in high temperature head transducer environments have TCR values exceeding about 2%/° C. In certain embodiments, thermal sensors for use in high temperature head transducer environments have TCR values exceeding about 2.5%/° C. In some embodiments, thermal sensors for use in high temperature head transducer environments have TCR values exceeding about 3%/° C. In yet other embodiments, thermal sensors for use in high temperature head transducer environments have TCR values exceeding between about 3.5 to 5%/° C. In further embodiments, thermal sensors for use in high temperature head transducer environments have TCR values exceeding about 6%/° C., such as greater than about 7%/° C., 8%/° C., 9%/° C. or 10%/° C., for example.

According to various embodiments, a TCR sensor comprises a conducting ceramic material having a temperature coefficient of resistance. In accordance with some embodiments, a TCR sensor comprises a transparent conducting ceramic material having a temperature coefficient of resistance. In some embodiments, a TCR sensor comprises a transparent conducting ceramic material having a temperature coefficient of resistance and a transmittance of at least about 60%. In other embodiments, a TCR sensor comprises a transparent conducting ceramic material having a temperature coefficient of resistance and a transmittance of at least about 70%. In further embodiments, a TCR sensor comprises a transparent conducting ceramic material having a temperature coefficient of resistance and a transmittance of at least about 75 to 85%. In other embodiments, a TCR sensor comprises a transparent conducting ceramic material having a temperature coefficient of resistance and a transmittance of at least about 80 to 90%. According to some embodiments, a TCR sensor comprises a transparent conducting oxide (TCO) having a temperature coefficient of resistance, wherein the TCO has a transmittance value or range listed above.

In accordance with various embodiments, a TCR sensor comprises a conducting ceramic material having a temperature coefficient of resistance and an electrical resistivity of less than about $10^{-3}$ Ωcm. In some embodiments, a TCR sensor comprises a conducting ceramic material having a temperature coefficient of resistance and an electrical resistivity of between about $10^{-4}$ Ωcm and $10^{-3}$ Ωcm. In other embodiments, a TCR sensor comprises a conducting ceramic material having a temperature coefficient of resistance and an electrical resistivity of less than about $10^{-4}$ Ωcm. In further embodiments, a TCR sensor comprises a conducting ceramic material having a temperature coefficient of resistance and an electrical resistivity of between about $10^{-5}$ Ωcm and $10^{-4}$ Ωcm.

Various embodiments incorporate impurity-doped transparent conducting oxides for high-TCR, high-temperature capable thermal sensing elements. Suitable materials include ZnO, Al-doped ZnO, or Ga-doped ZnO. For example, thermal sensors comprising pure ZnO films can have TCR values in the 1-10%/° C. range. By way of further example, experiments using 100 nm Al-doped ZnO films prepared by atomic layer deposition demonstrates that thermal sensors comprising such Al-doped ZnO films can provide for TCR values of 1%/° C. or more. It is notable that these TCR values are about 4-50 times higher than TCR values achievable using conventional TCR sensor materials.

Embodiments of the disclosure are directed to a TCR sensor comprising a ceramic material comprising AZO (Al-doped zinc oxide). According to various embodiments, a TCR sensor includes a ceramic material comprising AZO, wherein a concentration of Al in the Al-doped ZnO ranges between about 0.1 and 15 weight %. (wt %). In some embodiments, a TCR sensor includes a ceramic material comprising AZO, wherein a concentration of Al in the Al-doped ZnO ranges between about 0.1 and 8 wt %. In other embodiments, a TCR sensor includes a ceramic material comprising AZO, wherein a concentration of Al in the Al-doped ZnO ranges between about 0.1 and 4 wt %.

According to various embodiments, a TCR sensor includes a ceramic material comprising GZO (Ga-doped zinc oxide). According to various embodiments, a TCR sensor includes a ceramic material comprising GZO, wherein a concentration of Ga in the Ga-doped ZnO ranges between about 0.1 and 15 wt %. In some embodiments, a TCR sensor includes a ceramic material comprising GZO, wherein a concentration of Ga in the Ga-doped ZnO ranges between about 0.1 and 8 wt %. In other embodiments, a TCR sensor includes a ceramic material comprising GZO, wherein a concentration of Ga in the Ga-doped ZnO ranges between about 0.1 and 4 wt %.

In accordance with some embodiments, Al- and Ga-doped ZnO films having a thickness of between about 3-50 nm can be used to fabricate TCR sensors suitable for incorporation in a head transducer. According to other embodiments, Al- and Ga-doped ZnO films having a thickness of between about 5-30 nm can be used to fabricate TCR sensors suitable for incorporation in a head transducer. In further embodiments, Al- and Ga-doped ZnO films having a thickness of between about 5-20 nm can be used to fabricate TCR sensors suitable for incorporation in a head transducer.

In accordance with some embodiments, various formulations of impurity-doped ZnO films can be used in TCR sensors suitable for incorporation in a head transducer. A representative list of ZnO dopants is provided below in Table 1. The dopant content (in wt %) and resistivity ($\times 10^{-4}$ Ωcm) for each ZnO dopant is also provided in Table 1 below.

TABLE 1

| ZnO Dopant | Dopant Content (wt %) | Resistivity × $10^{-4}$ (Ω cm) |
|---|---|---|
| $Al_2O_3$ | 1-2 | 0.85 |
| $Ga_2O_3$ | 2-7 | 1.2 |
| $B_2O_3$ | 2 | 2.0 |
| $Sc_2O_3$ | 2 | 3.1 |
| $SiO_2$ | 6 | 4.8 |
| $V_2O_5$ | 0.5-3 | 5.0 |
| F | 0.5 (at %) | 4.0 |
| None | 0 | 4.5 |

Impurity-doped ZnO films with a resistivity on the order of $10^{-4}$ Ωcm can be prepared using a variety of processes, including magnetron sputtering (MSP), pulsed laser deposition (PLD), vacuum arc plasma evaporation (VAPE), metal organic molecular beam deposition (MOMBD), and metal organic chemical vapor deposition (MOCVD). For example, AZO and GZO films for TCR sensors with a resistivity on the order of $1 \times 10^{-4}$ Ωcm can be prepared using PLD and VAPE. AZO films for use in TCR sensors with a resistivity on the order of $1 \times 10^{-5}$ Ωcm can be prepared by PLD.

In accordance with other embodiments, thin films of conducting ZnO for use in various TCR sensor embodiments can be produced by a variety of techniques, including pulsed laser deposition at room temperature, atomic layer deposition between about 90 and 200° C., and reactive magnetron sputtering, all of which are well known recording head and/or microelectronic fabrication processes. The following are known examples of preparing AZO films adaptable for use in TCR sensors according to various embodiments:

Example #1

Aluminum doped zinc oxide (AZO) films were prepared by radio frequency magnetron sputtering on glass or Si substrates using specifically designed ZnO targets containing different amount of $Al_2O_3$ powder as the Al doping source. The structural, electrical, and optical properties of the AZO films were investigated in terms of the preparation conditions, such as the $Al_2O_3$ content in the target, RF power, substrate temperature, and working pressure. The doping concentration in the film was 1.9 at. % for 1 wt % $Al_2O_3$ target, 4.0 at. % for 3 wt % $Al_2O_3$ target, and 6.2 at. % for 5 wt % $Al_2O_3$ target. The resistivity of the AZO film prepared with the 3 wt % $Al_2O_3$ target was ~$4.7 \times 10^{-4}$ Ωcm, and depends mainly on the carrier concentration. The optical transmittance of a 1500-Å-thick film at 550 nm, for example, is ~90%.

Example #2

Transparent conductive Al doped zinc oxide (ZnO: Al, AZO) thin films with a thickness of 4 nm were prepared on the Corning glass substrate by radio frequency magnetron sputtering. The properties of the AZO thin films were investigated at different substrate temperatures (from 27 to 15° C.) and sputtering power (from 15 to 25 W). The structural, optical and electrical properties of the AZO thin films were investigated. The optical transmittance of about 78% (at 415 nm)-92.5% (at 63 nm) in the visible range and the electrical resistivity of $7 \times 10^{-4}$ Ωcm (175.2 Ω/sq) were obtained.

Other TCO materials can be used in TCR sensors according to various embodiments. Examples include impurity-doped $In_2O_3$ and $SnO_2$, and multicomponent oxides composed of combinations of these binary compounds. Films of impurity-doped $In_2O_3$ and $SnO_2$ provide for resistivity values on the order of $1 \times 10^{-4}$ Ωcm.

Table 2 below lists a variety of TCO materials that can be used in TCR sensors of a head transducer in accordance with various embodiments.

TABLE 2

| Material | Dopant or Compound |
|---|---|
| $SnO_2$ | Sb, F, As, Nb, Ta |
| $In_2O_3$ | Sn, Ge, Mo, F, Ti, Zr, Hf, Nb, Ta, W, Te |
| ZnO | Al, Ga, B, In, Y, Sc, F, V, Si, Ge, Ti, Zr, Hf |
| $ZnO$—$SnO_2$ | $Zn_2SnO_4$, $ZnSnO_3$ |
| $ZnO$—$In2O_3$ | $Zn_2In_2O_5$, $Zn_3In_2O_6$ |
| $In_2O_3$—$SnO_2$ | $In_4Sn_3O_{12}$ |
| $GaInO_3$, $(Ga, In)_2O_3$ | Sn, Ge |
| $ZnO$—$In_2O_3$—$SnO_2$ | $Zn_2In_2O_5$—$In_4Sn_3O_{12}$ |

According to some embodiments, a TCR sensor can comprise $ZnO$—$In_2O_3$ films. In some embodiments, $ZnO$—$In_2O_3$ films can be prepared at room temperature with an In content of about 75.5 and 90 at % by DC magnetron sputtering and VAPE, respectively. Such $ZnO$—$In_2O_3$ films can exhibit a resistivity as low as $3\times10^{-4}$ Ωcm. In addition, $ZnO$—$In_2O_3$ films having a thicknesses of less than 400 nm exhibit an average transmittance above 80% in the visible range. In other embodiments, a TCR sensor can comprise $In_4Sn_3O_{12}$ films. In accordance with some TCR sensor embodiments, a resistivity of $2\times10^{-4}$ Ωcm can be realized using $In_4Sn_3O_{12}$ films prepared with an Sn content of 50 at % on substrates at 350° C.

TCR sensors according to some embodiments can include TCO films having a structure of zinc oxide/tungsten doped indium oxide/zinc oxide (ZnO/IWO/ZnO). Such TCO films can be fabricated using a pulsed laser technique. A TCR sensor comprising ZnO/IWO/ZnO provides for low resistivity (e.g., $1.24\times10^{-4}$ Ω·cm) and good transmittance (e.g., >about 75-80%). Resistivity of ZnO/IWO/ZnO films, for example, can range between about $1.04\times10^{-4}$ Ω·cm to $8.19\times10^{-3}$ Ω·cm with ZnO film thickness increasing between about 0 nm to 90 nm, respectively.

Various embodiments of the disclosure are directed to TCR sensors comprising ITO (indium tin oxide) films. In some embodiments, ITO thin films have a resistivity on the order of $1\times10^{-4}$ Ωcm. Some ITO embodiments provide for low resistivity on the order of $1\times10^{-5}$ Ωcm. Such low resistivity ITO films are typically prepared with impurity-doped binary compounds. ITO films suitable for use in TCR sensors of a head transducer can be fabricated using a variety of processes. The following processes can be used to produce ITO films with low resistivity on the order of $1\times10^{-5}$ Ωcm:

TABLE 3

| Resistivity | Deposition Method |
|---|---|
| $7.4 \times 10^{-5}$ | Selective doping by zone confining |
| $8.9 \times 10^{-5}$ | Pulsed laser deposition |
| $7.2 \times 10^{-5}$ | Pulsed laser deposition |
| $9.5 \times 10^{-5}$ | Spray pyrolysis |
| $8.45 \times 10^{-5}$ | Pulsed laser deposition |

Depending on the particular ceramic or TCO materials used in a TCR sensor, resistivities in the range of about $10^{-4}$ Ωcm and $10^{-3}$ Ωcm can be obtained according to various embodiments, which would result in a thermal sensor having a resistance in the 5 kΩ to 500 kΩ range. In general, a thermal sensor having a resistance in the 5 kΩ to 500 kΩ range may be considered a high-impedance sensor, which would require an appropriately designed preamplifier to drive and sense such a high-impedance thermal sensor. It is well within the skill level of amplifier designers to design a preamplifier suitable for driving and sensing a high-impedance TCR sensor according to various embodiments of the disclosure.

Figure 3:
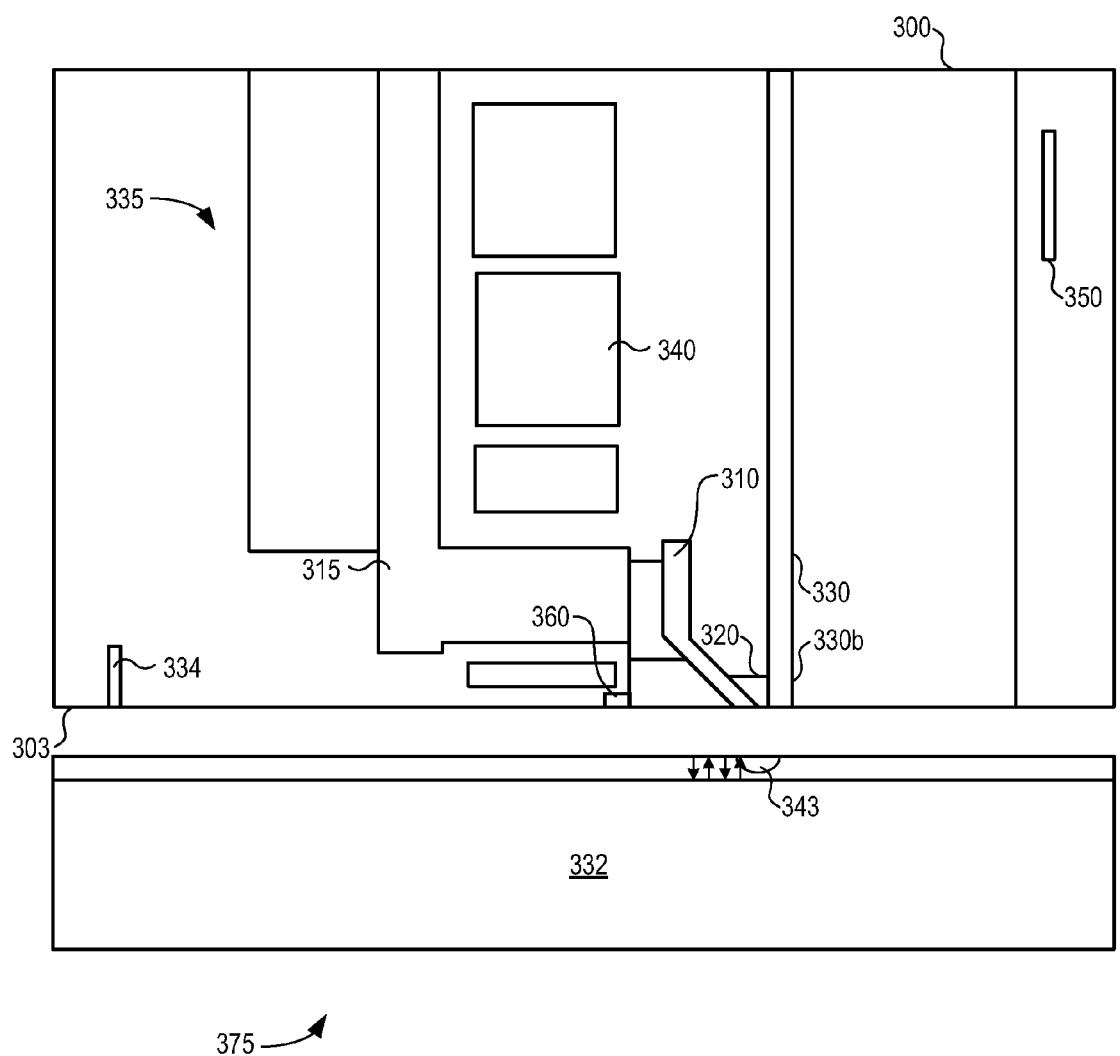
FIG. 3 is an enlarged schematic sectional view of a head transducer arrangement in accordance with various embodiments.
Figure 4:
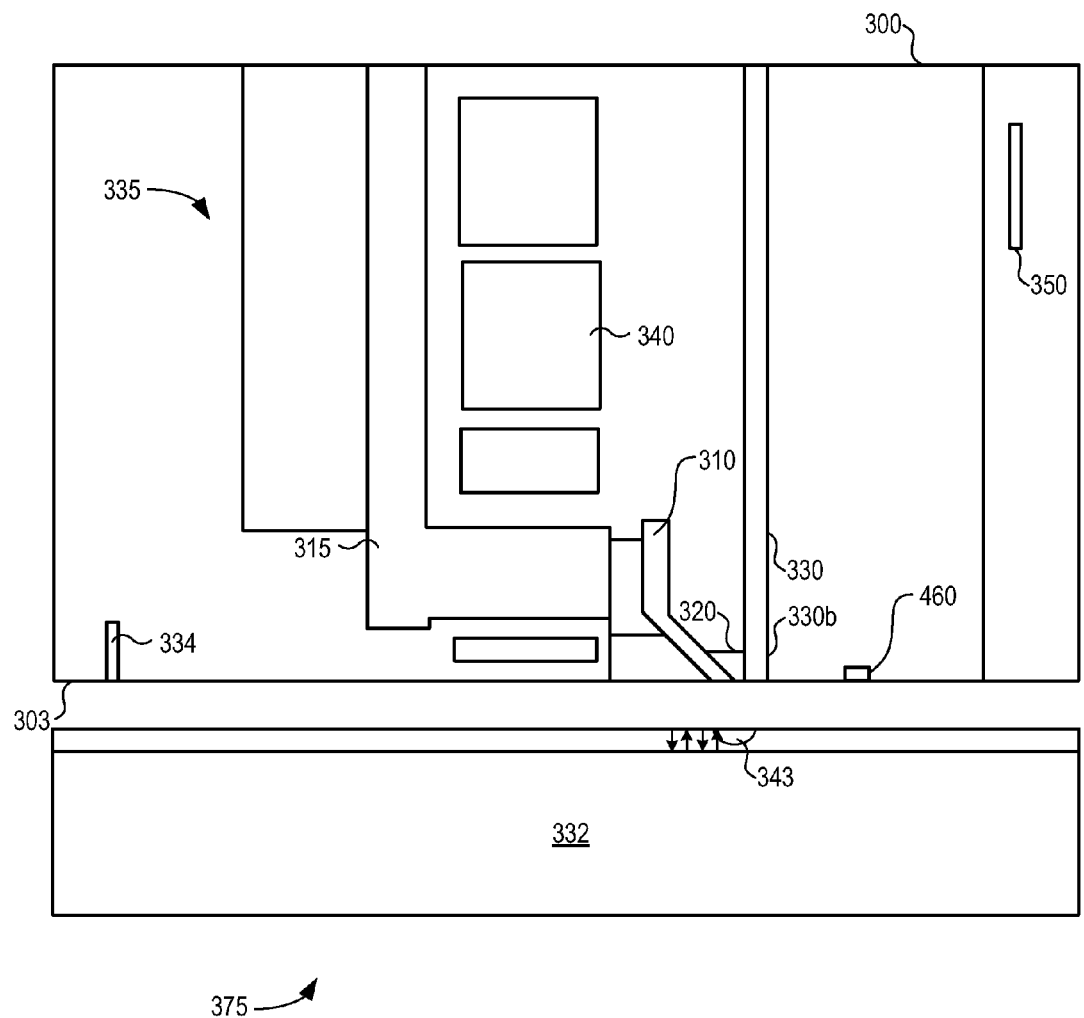
FIG. 4 is an enlarged schematic sectional view of a head transducer arrangement in accordance with other embodiments.

FIGS. 3 and 4 are schematics that illustrate structures and features that may be included in the components according to embodiments of FIG. 1. FIGS. 3 and 4 are nearly the same in terms of components and configuration, but differ in the location of a thermal sensor situated at or near an air bearing surface of the head transducer. FIGS. 3 and 4 show cross-sections of a head transducer 300 in accordance with various embodiments. The portion of head transducer 300 illustrated in FIGS. 3 and 4 includes three heat sources; a write coil 340, an NFT 320, and a heater 350, that cause a thermal protrusion of an air bearing surface 303 of the head transducer 300. One or more TCR sensors can be located at or near specified locations of the air bearing surface 303, particularly near heat producing components of the head transducer 300.

In the embodiment shown in FIG. 3, a thermal sensor 360 is located on the pole side of the head transducer 300, between a writer 335 and a waveguide 330 which is optically coupled to NFT 320. In one configuration, at least a portion of thermal sensor 360 is co-extensive with a portion of the return pole 315 of the writer 335 along an axis normal to the air bearing surface. In the embodiment shown in FIG. 4, a thermal sensor 460 is located on the non-pole side of the head transducer 300, outside of the magnetic pathway defined between the write pole 310 and write return pole 315. In FIG. 4, thermal sensor 460 is situated at or near the air bearing surface 303 between NFT 320 or waveguide 330 and a writer heater 350.

With further reference to FIGS. 3 and 4, the head transducer 300 may comprise a relatively thick substrate on which is disposed the multiplicity of thin layers. The layers cooperate to define the respective components of the head transducer 300. The layers include a multiplicity of layers tailored to form, for example, a magnetic writer 335 and a magnetic reader 334. The layers may also be patterned to form coils 340 which, when energized with an electrical current, produce a magnetic field passes through the writer 335 and through a portion of the writeable medium 375. One end or terminus 310 (referred to as a write pole) of the writer 335 may be configured to produce a high flux density of the magnetic field. Another end or terminus 315 (referred to as a return pole) of the writer 335, coupled to the write pole 310 via a yoke of the writer, may be configured to produce a lower flux density.

The layers of the head transducer 300 also layers tailored to form a (passive) waveguide 330, an NFT 320, and the thermal sensor 360/460. A laser (not shown in FIGS. 3 and 4) may be formed in the head transducer layers, may be mounted on the heat transducer or may be disposed in a cavity in the head transducer and is optically coupled to the NFT 320 through the waveguide 330.

The writeable medium 375 may be configured in any known way, but typically it includes a plate or substrate 332 on which at least a hard magnetic layer 344 is deposited or otherwise formed. A small portion or spot 343 of the layer 344 may be heated sufficiently to reduce the coercivity of the material enough so that the magnetic field from the magnetic write pole 310 is strong enough to change the magnetization direction of the recording layer 344. Bits of information may then be recorded in the form of a perpendicular upward downward magnetization direction for a series of magnetic domains in the layer 344.

The heating of the spot 343 in connection with the write procedure may be provided directly by the NFT 320 and indirectly by the laser. When the laser is energized, laser light is emitted from the laser is coupled into the waveguide, whether by end-fire coupling or otherwise. The laser light is conveyed to a distal end 330b of the waveguide 330. In some cases, the distal end may correspond to a focal point or focal region of a solid immersion mirror (SIM) or a solid immersion lens (SIL). Located at or near the distal end 330b is the NFT 320, which may be formed as part of the plurality of layers. The NFT 320 utilizes plasmons to convert the power density of the incident laser light into a high power density in a near-field region that is typically smaller than the diffraction limit for the laser light. The high power density provided by the NFT 320 in the near-field region is absorbed by the nearby writeable medium 375 to produce localized heating of the spot 343. By positioning an emitting end of the NFT 320 close enough to the write pole 310 of the writer 335, at least a portion of the heated spot 343 can be exposed to the high magnetic flux emitted by the write pole 310 before passing out of range (due to the relative motion of the writeable medium 375) so that the magnetic field at the write pole 310 is capable of changing the magnetization direction of the spot 343.

The heating of spot 343 also causes protrusion of a region of the air bearing surface 303 of the head 300. To measure the temperature change and corresponding protrusion, one or more thermal sensors, e.g., thermal sensors 360 and 460, can be located proximate the NFT 329 and/or write 310 or return 315 poles in a protrusion region of the air bearing surface 303.

The NFT 320 may be a suitably sized pin or other structure and may be made of a metal such as gold or other suitable materials. The NFT 320 may have any suitable design known in the art. The NFT 320 is shown in FIGS. 3 and 4 to be close to but separated from waveguide 330, but in other embodiments the NFT 320 may be disposed within the waveguide 330. In still other embodiments, the laser may be integrated into the head transducer and the waveguide may be omitted. In an integrated laser configuration, the NFT 320 may couple directly to the integrated semiconductor laser.

Figure 5:
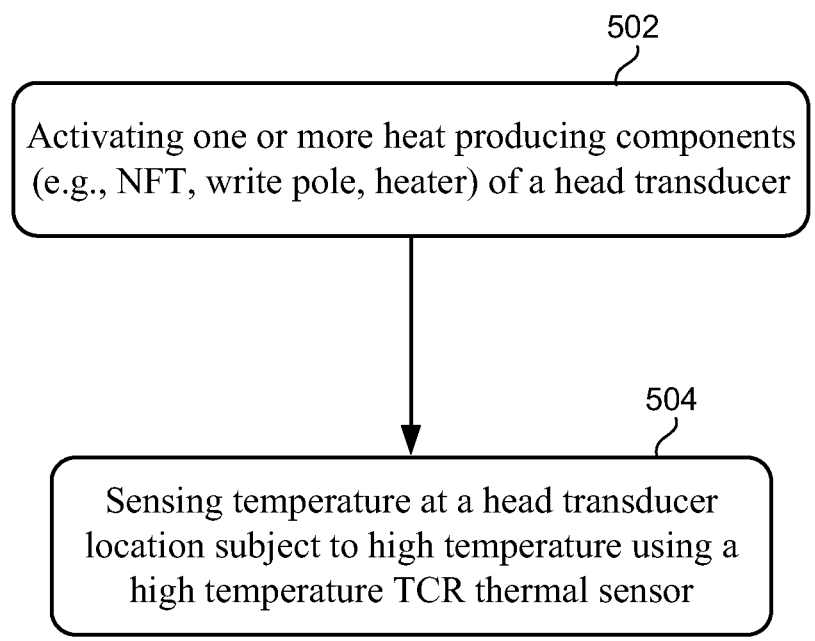
FIGS. 5 and 6 are flow charts showing various processes of methods employing a high-TCR sensor for sensing head transducer temperature in accordance with various embodiments.

With reference to FIG. 5, a method of sensing temperature in a head transducer is set forth in accordance with various embodiments. The method shown in FIG. 5 involves activating 502 one or more heat producing components of a transducer head. The heat producing components of the head transducer include an NFT, a write pole, and a writer heater, for example. The method of FIG. 5 further involves sensing 504 temperature at a head transducer location subject to high temperature using a high temperature TCR thermal sensor, such as those described hereinabove.

Figure 6:
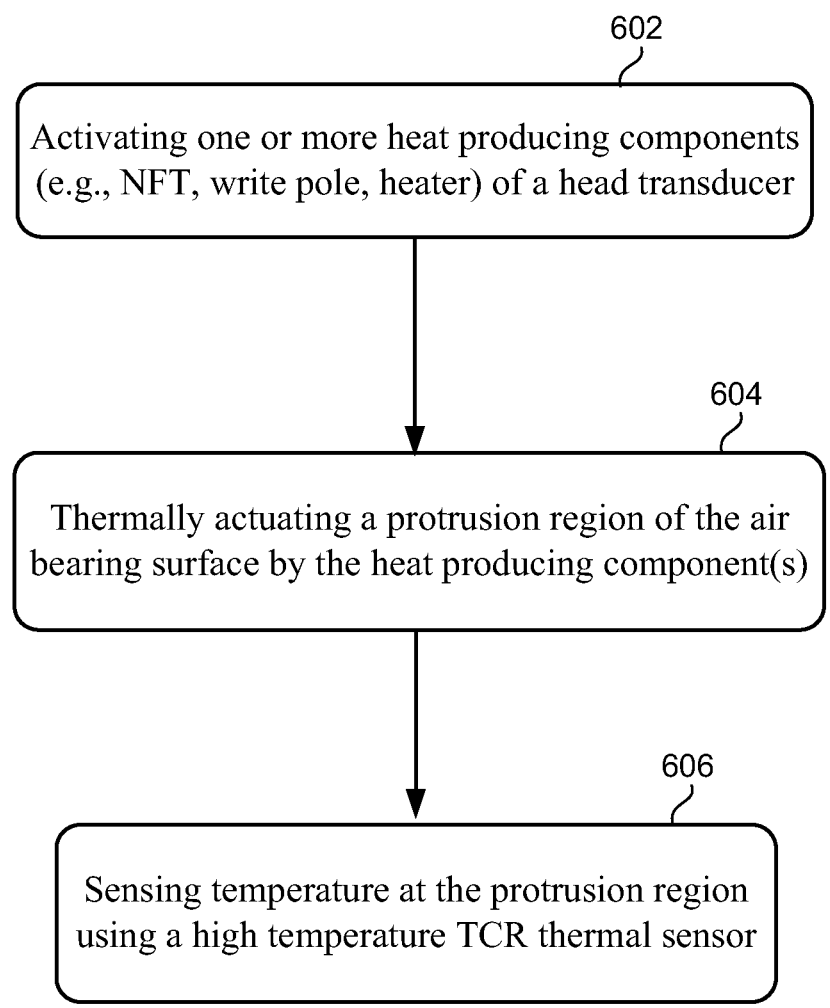

FIG. 6 illustrates a method for sensing temperature in a head transducer in accordance with various embodiments. The method shown in FIG. 6 involves activating 602 one or more heat producing components of a transducer head. The heat producing components of the head transducer include an NFT, a write pole, and a writer heater, for example. The method of FIG. 6 further involves thermally actuating 604 a protrusion region of the head transducer's air bearing surface by the one or more heat producing components. The method of FIG. 6 also involves sensing 606 temperature at the protrusion region using a high temperature TCR thermal sensor, such as those described hereinabove.

Figure 7:
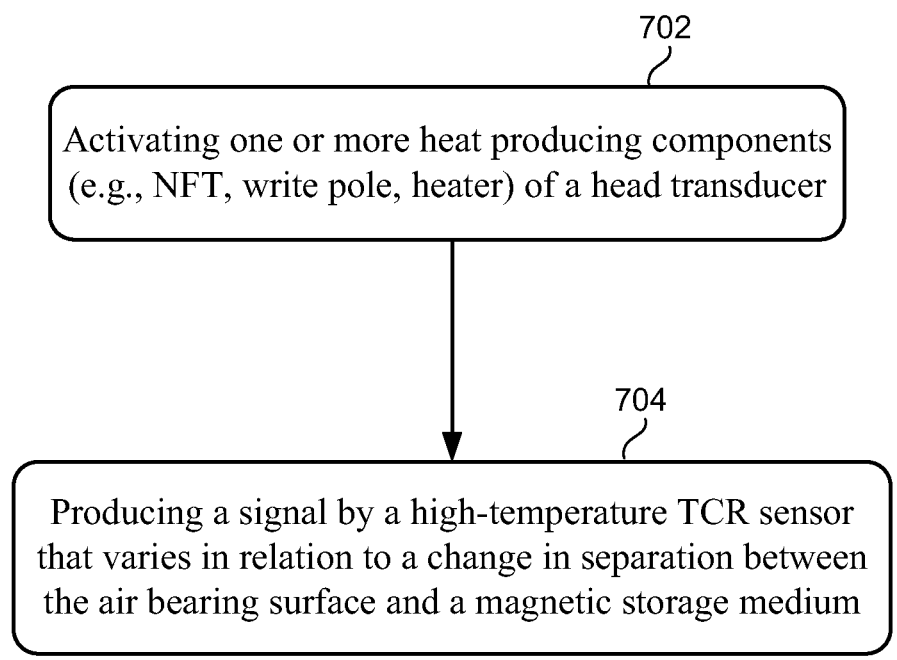

FIG. 7 illustrates a method for sensing head-media separation and/or contact according to various embodiments. The method shown in FIG. 7 involves activating 702 one or more heat producing components of a transducer head. The heat producing components of the head transducer include an NFT, a write pole, and a writer heater, for example. The method of FIG. 7 further involves producing 704 a signal by a high-temperature TCR sensor that varies in relation to a change in separation between the air bearing surface of the transducer head and a magnetic storage medium. The signal, e.g., resistance or rate of change of resistance, can also be indicative of contact between the air bearing surface and magnetic storage medium in proximity to the air bearing surface as discussed above.

FIG. 8 illustrates a method for sensing head-media separation and/or contact according to various embodiments. The method shown in FIG. 8 involves activating 802 one or more heat producing components of a transducer head. The heat producing components of the head transducer include an NFT, a write pole, and a writer heater, for example. The method of FIG. 8 also involves thermally actuating 804 a protrusion region of the head transducer's air bearing surface by the one or more heat producing components of the transducer head (e.g., NFT, write pole, writer heater). The method of FIG. 8 further involves producing 806 a signal by a high-temperature TCR sensor that varies in relation to a change in separation between the air bearing surface of the transducer head and a magnetic storage medium. The signal, e.g., resistance or rate of change of resistance, can also be indicative of contact between the air bearing surface and magnetic storage medium in proximity to the air bearing surface as discussed above.

In some embodiments, the TCR sensor signal can be combined with a second thermal sensor signal produced by a second thermal sensor located away from the protrusion region, such as at a transducer location not influenced by the thermal boundary condition at the close point or air bearing surface. This second TCR sensor can be, but need not be, a high-temperature TCR sensor of the kind disposed adjacent the NFT. For example, the second TCR sensor can be of a conventional design. The common mode of the two sensor signals can be subtracted or canceled, such that the resulting signal is indicative of head-media separation changes and/or head-media contact.

Various techniques can be employed for detecting head-media contact and separation according to embodiments of the disclosure, such as those disclosed in the commonly owned patent references cited hereinabove. According to one approach, a measure of the head-to-medium interface cooling condition is the rate of the temperature rise over heater power, or $\Delta R/\Delta P$. The ratio $\Delta R/\Delta P$ decreases with a better cooling condition, and reaches a minimum at head-media contact. The ratio $\Delta R/\Delta P$ increases again after head-media contact due to frictional heating. The head-media contact can be detected by monitoring the metric $\Delta R/\Delta P$ instead of the head modulation. The metric $\Delta R/\Delta P$ deviates (drops) from a linear trend first before it reaches the minimum. This signature indicates the cooling caused by initiation of the head-media contact. The minimum point of $\Delta R/\Delta P$ indicates full head-media contact and that heat is generated by friction. Various methods of detecting head-media contact utilize the rate of the temperature rise in a head transducer over heater power supplied to a head transducer heater. A change in phase of the thermal sensor signal relative to a reference signal can also be used to detect head-media contact.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
a head transducer configured for heat assisted magnetic recording; and
a thermal sensor at the head transducer, the thermal sensor comprising a transparent conducting ceramic material having a temperature coefficient of resistance and the thermal sensor being configured to operate in a thermal environment having a temperature of at least 200° C.

2. The apparatus of claim 1, wherein the transparent conducting ceramic material comprises a transparent conducting oxide.

3. The apparatus of claim 1, wherein the transparent conducting ceramic material has a transmittance of at least about 70%.

4. The apparatus of claim 1, wherein the transparent conducting ceramic material has an electrical resistivity of between about $10^{-4}$ and $10^{-3}$ $\Omega$cm.

5. The apparatus of claim 1, wherein the transparent conducting ceramic material has an electrical resistivity of between about $10^{-5}$ and $10^{-4}$ $\Omega$cm.

6. The apparatus of claim 1, wherein the temperature coefficient of resistance of the transparent conducting ceramic material is at least about 0.5%/° C.

7. The apparatus of claim 1, wherein the temperature coefficient of resistance of the transparent conducting ceramic material ranges between about 1%/° C. and 10%/° C.

8. The apparatus of claim 1, wherein the transparent conducting ceramic material comprises AZO.

9. The apparatus of claim 1, wherein the transparent conducting ceramic material comprises GZO.

10. The apparatus of claim 1, wherein the transparent conducting ceramic material comprises impurity-doped $In_2O_3$.

11. The apparatus of claim 1, wherein the transparent conducting ceramic material comprises impurity-doped $SnO_2$.

12. An apparatus, comprising:
a head transducer;
a near-field transducer at the head transducer; and
a thermal sensor proximate the near-field transducer and configured to produce a sensor signal indicative of temperature and configured to operate in a thermal environment having a temperature of at least 200° C., the thermal sensor comprising a transparent conducting oxide having a temperature coefficient of resistance.

13. The apparatus of claim 12, wherein the thermal sensor is configured to operate in a thermal environment having a temperature of up to at least about 250° C.

14. The apparatus of claim 12, wherein the transparent conducting oxide comprises AZO.

15. The apparatus of claim 12, wherein the transparent conducting oxide comprises GZO.

16. The apparatus of claim 12, wherein the transparent conducting oxide comprises impurity-doped $In_2O_3$.

17. The apparatus of claim 12, wherein the transparent conducting oxide comprises impurity-doped $SnO_2$.

18. The apparatus of claim 12, wherein the thermal sensor is configured to sense contact between the head transducer and one or both of a magnetic storage medium and thermal asperities arising from the magnetic storage medium.

19. A method, comprising:
sensing a temperature proximate a near-field transducer of a head transducer using a thermal sensor configured to operate in a thermal environment having a temperature of at least 200° C., the thermal sensor comprising a transparent conducting oxide having a temperature coefficient of resistance.

20. The method of claim 19, further comprising sensing contact between the head transducer and one or both of a magnetic storage medium and thermal asperities arising from the magnetic storage medium.

21. The method of claim 19, wherein the transparent conducting oxide comprises one of AZO and GZO.

22. The method of claim 19, wherein the transparent conducting oxide comprises one of impurity-doped $In_2O_3$ and impurity-doped $SnO_2$.

* * * * *